US011968493B2

(12) United States Patent
Bønnelykke et al.

(10) Patent No.: US 11,968,493 B2
(45) Date of Patent: Apr. 23, 2024

(54) HEADSET AND/OR HEARING PROTECTION DEVICE COMPRISING A WATERPROOF SPEAKER ASSEMBLY WITH DECOMPRESSION

(71) Applicant: Invisio Communications A/S, Hvidovre (DK)

(72) Inventors: Jesper Rye Bønnelykke, Valby (DK); Dennis Normann Andersen, Ølstykke (DK); Morten Berg Arnoldus, Frederiksberg C (DK)

(73) Assignee: INVISIO A/S, Hvidovre (DK)

( * ) Notice: Subject to any disclaimer, the term of this patent is extended or adjusted under 35 U.S.C. 154(b) by 103 days.

(21) Appl. No.: 17/595,074

(22) PCT Filed: May 11, 2020

(86) PCT No.: PCT/EP2020/062971
§ 371 (c)(1),
(2) Date: Nov. 8, 2021

(87) PCT Pub. No.: WO2020/225450
PCT Pub. Date: Nov. 12, 2020

(65) Prior Publication Data

US 2022/0225013 A1 Jul. 14, 2022

(30) Foreign Application Priority Data

May 9, 2019 (DK) .......................... PA 2019 70298

(51) Int. Cl.
*H04R 1/10* (2006.01)
*H04R 1/02* (2006.01)
(Continued)

(52) U.S. Cl.
CPC .......... *H04R 1/1075* (2013.01); *H04R 1/023* (2013.01); *H04R 1/1008* (2013.01);
(Continued)

(58) Field of Classification Search
CPC . H04R 1/02; H04R 1/28; H04R 1/288; H04R 1/2803; H04R 1/2888;
(Continued)

(56) References Cited

U.S. PATENT DOCUMENTS 4,646,872 A 3/1987 Kamon
4,742,887 A * 5/1988 Yamagishi .............. H04R 1/22 381/372
(Continued)

FOREIGN PATENT DOCUMENTS

CN 207184747 U 9/2017
EP 2566189 A1 3/2013
(Continued)

OTHER PUBLICATIONS

International Search Report and Written Opinion of International Searcing Authority for Application No. PCT/EP2020/062971, dated Jul. 15, 2020 (10 pages).
(Continued)

*Primary Examiner* — Thang V Tran
(74) *Attorney, Agent, or Firm* — Nixon Peabody LLP

(57) ABSTRACT

A headset and/or a hearing protection device comprises a waterproof speaker assembly. The waterproof speaker assembly comprises a speaker unit, a waterproof speaker housing, and a waterproof pressure equalization element. The speaker unit includes a transducer configured to generate an audio frequency signal. The waterproof speaker housing is configured to receive and sealably enclose, in part or in full, the speaker unit in an interior or a cavity of the waterproof speaker housing. The waterproof pressure equalization element is permeable to air. The waterproof speaker housing is configured to receive and/or support the waterproof pressure equalization element. The waterproof pressure equalization element is configured to equalize sur-
(Continued)

rounding or ambient pressure changes from the interior or cavity of the waterproof speaker housing.

22 Claims, 4 Drawing Sheets

(51) Int. Cl.
*H04R 1/24* (2006.01)
*H04R 1/28* (2006.01)

(52) U.S. Cl.
CPC ............ *H04R 1/1091* (2013.01); *H04R 1/24* (2013.01); *H04R 1/288* (2013.01); *H04R 2460/11* (2013.01)

(58) Field of Classification Search
CPC .. H04R 1/2823; H04R 1/2826; H04R 1/2834; H04R 1/2846; H04R 1/2849; H04R 1/023; H04R 1/025; H04R 1/026; H04R 1/028; H04R 1/24; H04R 1/345; H04R 1/44; H04R 1/1008; H04R 1/1075; H04R 1/1091; H04R 1/10; H04R 9/06; H04R 2400/11; H04R 2460/11
See application file for complete search history.

(56) References Cited

U.S. PATENT DOCUMENTS

| | | | | |
|---|---|---|---|---|
| 5,949,896 | A * | 9/1999 | Nageno ................ | H04R 1/2803<br>381/328 |
| 8,594,351 | B2 * | 11/2013 | Harlow ................ | H04R 1/1016<br>381/372 |
| 9,301,040 | B2 * | 3/2016 | Annunziato ......... | H04R 1/2826 |
| 2008/0317255 | A1 | 12/2008 | Cozens | |
| 2012/0128190 | A1 | 5/2012 | Tam | |
| 2012/0269375 | A1 | 10/2012 | Tan | |
| 2016/0366499 | A1 | 12/2016 | McGarry | |
| 2018/0206030 | A1 | 7/2018 | Cross | |

FOREIGN PATENT DOCUMENTS

| | | |
|---|---|---|
| JP | H01 101794 A | 4/1989 |
| JP | 2012099948 A | 5/2012 |

OTHER PUBLICATIONS

Danish Patent and Trademark Office , Search Report for Danish Patent Application No. PA 2019 70298, dated Nov. 13, 2019 (9 pages).

* cited by examiner

HEADSET AND/OR HEARING PROTECTION DEVICE COMPRISING A WATERPROOF SPEAKER ASSEMBLY WITH DECOMPRESSION

CROSS-REFERENCE TO RELATED APPLICATIONS

This application claims priority to and the benefit of International Application No. PCT/EP2020/062971, filed May 11, 2019, and Danish Application No. PA 2019 70298, filed May 9, 2019, each of which is incorporated by reference in its entirety.

FIELD OF THE INVENTION

The present invention relates generally to a headset and/or a hearing protection device or the like comprising a waterproof speaker assembly. More particularly, the present invention relates to a headset and/or a hearing protection device or the like comprising a waterproof speaker assembly comprising a speaker unit comprising a transducer configured to generate an audio frequency signal, a waterproof speaker housing, and a slave membrane configured to release the audio frequency signal to outside of the waterproof speaker assembly.

BACKGROUND

Certain electrical devices comprising one or more audio speakers are intended to be used also e.g. after being submersed in water or in other use situations with changing surrounding or ambient pressure. Such devices may e.g. be headsets and/or hearing protection devices or the like and in particular headsets and/or hearing protection devices for professional use in demanding environments and circumstances e.g. by armed or Special Forces, law enforcement personal, fire fighters, emergency personal, etc.

Accordingly, it is desirably to have such headsets and/or hearing protection devices or the like comprising one or more waterproof speaker assemblies allowing quick and reliable use also after being submersed in water, experiencing changing pressure, etc. In the context of professional use and especially for headsets and/or hearing protection devices comprising radio communication capabilities in this context, it is typically important to have clear and intelligible voice communication quickly or as fast as possible—also after resurfacing from water or having been exposed to other changes of pressure—as it can be crucial to be able to receive ambient sound (e.g. for hear-through/situational awareness), voice communication from others like orders, directives, objectives, information, etc. clearly and intelligibly.

In relation to certain headsets and/or hearing protection devices comprising one or more waterproof speaker assemblies, in particular for professional use in demanding environments and circumstances, a significant parameter is also how quickly a speaker assembly (and/or the device containing the assembly) is able to decompress or equalise the pressure after a pressure change of the ambient environment occurred. In an exemplary use scenario, a user may be located in a pressurised aircraft cabin where the pressure typically can be about 800 mbar. Prior to parachute jumping, the pressure of the cabin may be equalised to match the outside pressure, typically or e.g. being about 350 to about 250 mbar at an altitude of about 8 to about 10 kilometres. For certain professional uses there exists specifications in relation to how fast a device comprising a (waterproof) speaker assembly should decompress in the above or similar use scenario. If the device is able to decompress in 15 seconds or less from about 800 mbar to about 200 mbar it meets at least some specifications and the device is in this context designated as a rapid decompression device, a rapid decompression compatible device, or the like.

In another use scenario for certain professional use of a headset and/or hearing protection device comprising a waterproof speaker assembly and comprising radio communication capabilities, a significant parameter is that the device should allow the user to communicate and/or obtain situational awareness (e.g. if the device comprises hear-through capabilities) quickly or as a quickly as possible after resurfacing from submersion or other exposure to water.

Another significant parameter of a headset and/or a hearing protection device when making a speaker assembly waterproof and/or making a speaker assembly (rapid) decompression compatible is the resulting audio quality.

In certain known headsets and/or hearing protection devices comprising a waterproof speaker assembly, an assembly is made waterproof simply by enclosing the speaker of the assembly in a closed volume. However, this typically creates problems in relation to decompression and in particular in relation to rapid decompression. To mitigate this, a common solution is to reduce the closed volume as much as possible. However, this typically reduces or degrades the acoustic quality if not addressed further. Furthermore, certain known headsets and/or hearing protection devices comprising a waterproof speaker assembly simply relies on a waterproof damping felt or similar (typically provided on one side of the speaker to dampen the response characteristic of the speaker) to make the speaker assembly waterproof at least to some extent. However, the waterproof characteristic of such solutions are mixed at best with some solutions only being waterproof to a metres depth or less.

Accordingly, it would be an advantage to provide a headset and/or hearing protection device comprising a speaker assembly being waterproof and readily enabling (rapid) decompression. A further advantage would be to provide a headset and/or hearing protection device comprising a waterproof speaker assembly maintaining, or diminishing only to a small or at least lesser degree, the acoustic properties of the speaker assembly.

SUMMARY

It is an object to provide a headset and/or hearing protection device comprising a waterproof speaker assembly alleviating one or more of the above mentioned drawbacks at least to an extent.

According to a first aspect, this is achieved, at least to an extent, by a headset and/or hearing protection device comprising a waterproof speaker assembly comprising a speaker unit comprising a transducer configured to generate an audio frequency signal in response to a received electrical signal. The waterproof speaker assembly further comprises a waterproof speaker housing that is configured to receive and sealable enclose (in part or in full) the speaker unit in an interior or a cavity of the waterproof speaker housing. The waterproof speaker assembly further comprises a waterproof pressure equalization element being permeable to air. In at least some embodiments, the waterproof pressure equalization element is a waterproof pressure equalization membrane. In some embodiments, the waterproof speaker assembly further comprises a slave membrane. The slave membrane may herein equally be referred to as simply as a membrane or a passive membrane. The slave membrane is configured to release the audio frequency signal to outside of the waterproof speaker assembly, and is e.g. acoustically connected with the interior or cavity comprising the speaker unit, whereby the waterproof speaker assembly retains a relative high sensitivity with respect to the audio frequency signal of the transducer (only a bit less sensitivity is realised by the transducer in the waterproof speaker housing compared to the transducer when being located outside the waterproof speaker assembly) and a low lowest resonance frequency (often denoted f0).

In alternative embodiments, the waterproof speaker assembly further comprises an additional speaker unit in the interior or cavity of the waterproof speaker housing instead of a slave membrane as described above. In such embodiments, the waterproof speaker housing is configured to receive and sealable enclose (in part or in full) both speaker units in the interior or cavity of the waterproof speaker housing.

The waterproof speaker housing is configured to receive and/or support the slave membrane (if present) and/or to receive and/or support the waterproof pressure equalization element. Additionally, the waterproof pressure equalization element is configured to equalize surrounding or ambient pressure changes from the interior or cavity and the waterproof speaker housing comprising the speaker unit. The waterproof pressure equalization element is e.g. acoustically connected with or to the interior or cavity.

In this way, a headset and/or hearing protection device comprising a waterproof speaker assembly is provided readily enabling efficient decompression, e.g. when being in environments with changing surrounding or ambient pressure or changing between environments with changing surrounding or ambient pressure, such as a pressurised aircraft cabin, re-surfacing from a body of water, or other, while still providing good or sufficient audio quality. As mentioned, the obtained high sensitivity and relative low resonance frequency is at least comparable to what sensitivity and resonance frequency the speaker unit (for embodiments comprising only a single speaker unit) otherwise would have outside the waterproof speaker housing. Furthermore, a waterproof speaker assembly is provided readily enabling efficient rapid decompression (as defined above/herein).

In preferred embodiments, the speaker unit (or for appropriate embodiments—each of both speaker units) is a non-active or passive speaker unit. The speaker unit(s) may be of any suitable speaker type e.g. a piezoelectric speaker, a MEMS speaker, a condenser or capacitor speaker, or of another suitable type. In some (e.g. further) embodiments, the speaker unit(s) is (are) a so-called micro-speaker. In some further preferred embodiments, the speaker unit(s) is (are) 'spider-less', i.e. does not comprise a spider commonly used for certain larger speaker unit designs (typically not suitable for integration in a headset and/or hearing protection device in the present context). Alternatively, the speaker unit(s) (or if several at least one of them) are active speaker unit(s).

The volume of the interior or cavity of the waterproof speaker housing is preferably kept relative small as this ensures that only a small volume of air or gas needs to be decompressed/pressure equalised and furthermore also enables that the overall dimensions of the waterproof speaker assembly can be kept small. Furthermore, a small volume of air or gas is relatively 'stiff', which is compensated for or at least mitigated by the slave membrane (for embodiments comprising such).

In some embodiments, the volume of the interior or cavity of the waterproof speaker housing is less than about 10 mL, less than about 100 mL, less than about 200 mL, or less than about 300 or 350 mL. In some embodiments, the volume of the interior or cavity of the waterproof speaker housing is between about 100 mL to about 200 mL or between about 200 mL to about 300 mL.

In at least some embodiments, the waterproof speaker assembly as disclosed herein (and accordingly its components and parts as relevant) are waterproof as rated by IP68 according to the well-known IEC standard 60529, also referred to as Ingress Protection Rating or Marking. The IP rating of how waterproof the waterproof speaker assembly is may vary according to specific intended use (and would be manufactured to meet a required level for a specific intended use).

In some embodiments, the waterproof speaker housing comprises or is connected to a waterproof side housing receiving and/or supporting the waterproof pressure equalization element. Accordingly, two separate (but connected) volumes, interiors, cavities, etc. is respectively provided by the side housing and the waterproof speaker housing. In some further embodiments, the waterproof side housing is arranged side-by-side to a remaining part of the waterproof speaker housing. This enables a very compact design of the waterproof speaker assembly. For example, it is possible to provide a waterproof speaker assembly with a reduced height or profile whereby it takes up less space in the headset and/or hearing protection device comprising the waterproof speaker assembly.

In some embodiments (comprising a slave membrane), the waterproof pressure equalization element and the slave membrane are arranged to generally face a same direction. This readily enables protection, e.g. against touch of a user, of both the waterproof pressure equalization element and the slave membrane by arranging them to be facing towards the interior of a device comprising the waterproof speaker assembly. This is advantageous since typically both the waterproof pressure equalization element and the slave membrane are sensitive elements that may become bent, dented, or otherwise degraded by user touch. The waterproof pressure equalization element and the slave membrane may e.g. be arranged to generally face a same direction towards an interior of the headset and/or hearing protection device, e.g. away from an ear of a user.

In some embodiments, the waterproof pressure equalization element is connected to the interior or cavity of the waterproof speaker housing (comprising the speaker unit(s)) via an acoustic channel or conduit. In some embodiments, where the waterproof speaker housing comprises or is connected to a waterproof side housing, the acoustic channel or conduit connects the respective interior volumes or cavities of these. In some further embodiments, the acoustic channel or conduit is configured to block or at least reduce the audio frequency signal (generated by the speaker unit(s)) towards the waterproof pressure equalization element. In this way, acoustic distortions originating from the pressure equalization element that otherwise would or could take place is avoided or at least reduced. Such often user perceivable acoustic distortions would or could arise at least more readily if the waterproof pressure equalization element would be acoustically connected more directly to the interior or cavity of the waterproof speaker housing; also due to a somewhat natural tendency of such waterproof pressure equalization elements to displace to a larger degree in one direction than in an opposite direction when subjected to larger sound pressures. In some embodiments, the acoustic channel or conduit terminates or ends at one end near or substantially near or in the vicinity of a centre of the waterproof pressure equalization element.

In some embodiments, the acoustic channel or conduit is configured to be from about 4, 5, or 6 mm to about 14, 15, or 16 mm, respectively, long and/or about 0.8, 1, or 1.2 mm to about 1.6, 2, or 2.4 mm, respectively, wide. In some embodiments, the acoustic channel or conduit is configured to be 5 mm to about 15 mm long and/or to be from about 1 mm to about 2 mm wide. Alternatively, the acoustic channel or conduit could be longer without diminishing (at least significantly) the blocking or reduction effect of the audio frequency signal from the interior or cavity towards the waterproof pressure equalization element. Preferably, the acoustic channel or conduit is configured to be sufficiently large (in particular sufficiently wide) to allow for passing of an airflow (while still being restricted for blocking or reducing the audio frequency signal) sufficiently enough to allow for (sufficiently fast) decompression and (at least for some embodiments) to allow for rapid decompression. Other factors influencing the decompression/rapid decompression capability is e.g. the used material of the waterproof pressure equalization element and its dimensions and shape. In some embodiments, the material of the waterproof pressure equalization element is PTEe (Polytetrafluoroethylene), however the material may be any suitable material having sufficient waterproofing characteristics. In some embodiments, the waterproof pressure equalization element has a thickness of between about 5 to about 50 micrometres and more preferably between about 10 to about 25 micrometres. For some embodiments, the material of the waterproof pressure equalization element is a sintered PTFe material having a thickness being about or less than one or two millimetres.

In some embodiments, the waterproof speaker housing, or for embodiments comprising a waterproof side housing then the waterproof side housing, comprises a substantially flat first contact area or surface receiving and/or supporting the waterproof pressure equalization element.

In some further embodiments, the substantially flat first contact area or surface is configured to reduce a physical contact between the substantially flat first contact area or surface and the waterproof pressure equalization element. This ensures or at least increases the likelihood of the waterproof pressure equalization element not sticking to the substantially flat contact area or surface, in particular after having been submersed in water. In some further embodiments, the substantially flat first contact area or surface comprises a grill or a mesh or similar, e.g. in a shape or form of a predetermined number of concentric circles achieves this. Alternatively, the first contact area or surface has another suitable shape or form and/or is configured to provide anti-sticking properties in another suitable way.

In some embodiments (comprising a slave membrane), the waterproof speaker housing comprises a second contact area or surface receiving and/or supporting the slave membrane where the second contact area or surface has a shape substantially mating, matching, or accommodating a shape of the slave membrane. This ensures (at least to a higher degree) that the slave membrane—when being pressed against the waterproof speaker housing, e.g. by water pressure arising from the waterproof speaker assembly being submersed in water—holds or maintains its shape and thereby does not (at least to the same degree) become bent, dented, or otherwise degraded. Otherwise, subsequent acoustic distortions could arise.

In some embodiments (comprising a slave membrane), the waterproof speaker housing comprises a plurality of openings configured to release the audio frequency signal from the speaker unit to or towards the slave membrane In some alternative or further embodiments, the plurality of openings could e.g. each comprise a smaller membrane or similar barrier replacing the slave membrane as described herein. In other words, instead of the slave membrane as described herein (which then is not used), each of the plurality of openings could comprise a smaller (slave) membrane with the same or similar overall functionality as the single bigger slave membrane.

In some embodiments (comprising only a single speaker unit), the speaker unit comprises a first side and an opposite second side, wherein the first side is waterproof (e.g. by comprising a further waterproof element or membrane as disclosed herein or in some other suitable way; the speaker unit (or at least its first side) may e.g. be waterproof by itself/by design) and facing away from the slave membrane and/or the interior or cavity of the waterproof speaker housing, and the waterproof speaker housing comprises an opening fitting or mating with the speaker unit (to seal the connection between the waterproof speaker housing and the speaker unit so the connection between them is/becomes waterproof) and configured to receive the speaker unit from the second side. In this way, the speaker unit is received at least partly (i.e. in part) and internally in the waterproof speaker housing with the waterproof first side facing away from the slave membrane and/or an interior of the waterproof speaker housing (i.e. the waterproof first side faces outwards of the waterproof speaker housing). Additionally, the speaker unit is configured to generate or emit the audio frequency signal from the second side. Accordingly, the waterproof slave membrane (and/or alternatively the (waterproof) openings configured to release the audio frequency signal from the speaker unit to or towards the slave membrane), the waterproof pressure equalization element, the waterproof speaker housing, and the first side of the speaker unit together forms a waterproof volume enclosing a part of the speaker unit. This provides a very compact waterproof speaker assembly, which also reduces the volume of air or gas to be decompressed/pressure equalised.

In some embodiments, the further waterproof element or membrane comprises a shape with an indentation pattern or similar configured to assist in, respectively, maintaining the shape of the further waterproof element or membrane even after being exposed to a high pressure (e.g. a water pressure arising from the waterproof speaker assembly being submersed in water) pressing the further waterproof element or membrane e.g. ‘flat’ against the speaker unit or the waterproof speaker housing. In some further embodiments, the indentation pattern may comprise a number of mainly elongated indentations tilted or angled across radial directions (from a centre point) of the further waterproof element or membrane (given that the element or membrane is substantially circular). The further waterproof element or membrane may e.g. comprise a circular concentric coil (sometimes referred to as voice coil), ring, or similar buttressing the membrane enabling it more readily to revert to its original or previous shape after a pressure, e.g. due to water, has been exerted upon it. It is noted, that the coil is not active (or necessarily magnetic) but rather function as a mechanical support. In some embodiments, the slave membrane comprises (either in addition or as an alternative), a similar or corresponding indentation pattern. In at least some embodiments, the slave membrane does not have a coil, ring, or similar but may be supported as disclosed herein.

In some embodiments, the material of the waterproof slave membrane (and/or the further waterproof element or membrane) is PET or other polymer material such as PE, EVA, PPE, PVC, etc.

In some embodiments, the speaker unit(s) comprises an (e.g. non-waterproof) acoustic damping felt on the second side.

In some embodiments, the slave membrane is waterproof.

In some embodiments, the waterproof pressure equalization element is a waterproof pressure equalization membrane.

In some embodiments, the slave membrane (if present) and/or the waterproof pressure equalization element is located on the outside/an exterior of the waterproof speaker housing and/or the waterproof side housing. By locating the waterproof pressure equalization element on the outside, it is readily facilitated that the waterproof pressure equalization element freely can 'balloon' out during decompression thereby preventing excessive peak pressure from building inside the construction. By locating the slave membrane (when present) on the outside, it is readily facilitated that the slave membrane and its perimeter is supported e.g. during deep submersion thereby preventing excessive stretching of the slave membrane which otherwise could damage it.

As mentioned, in some embodiments the waterproof speaker assembly comprises two speaker units in the interior or cavity of the waterproof speaker housing (and no slave membrane). More specifically in such embodiments, the waterproof speaker assembly comprises two speaker units, each speaker unit comprising a first side and an opposite second side wherein

- the first side of each speaker unit is waterproof and faces away from the interior or cavity of the waterproof speaker housing,
- the waterproof speaker housing comprises a first opening fitting or mating with a first of the two speaker units and configured to receive the first speaker unit from its second side, and
- the waterproof speaker housing comprises a second opening fitting or mating with a second of the two speaker units and configured to receive the second speaker unit from its second side.

In at least some embodiments, the two speaker units are identical or at least similar but could in other embodiments be different. In some embodiments, each speaker unit (or at least one) correspond to the speaker unit described above (and elsewhere) for embodiments comprising a single speaker unit and a slave membrane.

In some embodiments, the first and the second speaker units are located with their respective second sides being adjacent or facing each other. They may e.g. be located back-to-back e.g. touching or with space between them.

In some embodiments, each of the first and second speaker units is configured to generate or emit the audio frequency signal or a respective part of the audio frequency signal from its respective second side.

In some embodiments, the first speaker unit is configured to generate or emit a first part, e.g. a high-frequency part or range, of the audio frequency signal e.g. from its second side and the second speaker unit is configured to generate or emit a second part, e.g. a low-frequency part or range, of the audio frequency signal e.g. from its second side.

In some embodiments, the second speaker unit is a woofer or similar and the first speaker unit is a tweeter or similar.

In some embodiments, the second speaker unit (e.g. generating or emitted a low-frequency audio frequency signal or low-frequency part or range thereof) is located at the same side of the waterproof speaker housing as the waterproof pressure equalization element and this side is located away from the ear of a user when the waterproof speaker assembly is in place in an ear cup or similar of a headset and/or hearing protection device. Accordingly, the first speaker unit (e.g. generating or emitted a high-frequency audio frequency signal or high-frequency part or range thereof) is located closest to the ear of the user when place. In alternative embodiments, the second speaker unit (e.g. generating or emitted a low-frequency audio frequency signal or low-frequency part or range thereof) is located closest to the ear of a user when in place and the first speaker unit (e.g. generating or emitted a high-frequency audio frequency signal or high-frequency part or range thereof) is located furthest away from the ear of the user when place In some embodiments, the sizes, dimensions, or at least diameters of the two speaker units are different, e.g. if the first speaker unit is a woofer or similar and the second speaker unit is a tweeter or similar, the woofer or similar will typically be larger than the tweeter or similar.

In some embodiments, the speaker units are configured to generate or emit different respective audio frequency signals rather than the same audio frequency signal or different parts or ranges of the same audio frequency signal.

In some embodiments, each speaker unit comprises an acoustic damping felt on its second side.

It may not be significant (both for embodiments with two speaker units and embodiments with one speaker unit and a slave membrane as disclosed herein) what side (the first or the second) of a respective speaker unit is configured to generate or emit an audio frequency signal (or part or range thereof) from and accordingly, in at least some embodiments, it may be the respective first side(s) rather than second side(s) that is configured to generate or emit an audio frequency signal (or part or range thereof).

It is to be understood, that the device that the at least one waterproof speaker assembly is comprised by, may be or function 'only' as a headset (i.e. without hearing protection), may be or function only as an active and/or passive hearing protection device (i.e. without headset functionality), or may be or function as both a headset while also offering active and/or passive hearing protection. The headset and/or hearing protection device may be all types of headsets and/or hearing protection devices (and in particular types suitable for use after submersion in water) including traditional over the ear or circumaural devices, headsets and/or hearing protection devices having a neckband instead of a headband, helmet mounted headsets and/or hearing protection devices, etc.

Further details and embodiments are disclosed in the following.

Definitions

All headings and sub-headings are used herein for convenience only and should not be constructed as limiting the invention in any way.

The use of any and all examples, or exemplary language provided herein, is intended merely to better illuminate the present invention and does not pose a limitation on the scope of the invention unless otherwise claimed. No language in the specification should be construed as indicating any non-claimed element as essential to the practice of the invention.

This invention includes all modifications and equivalents of the subject matter recited in the claims appended hereto as permitted by applicable law.

When or if relative expressions such as “upper” and “lower”, “right” and “left”, “horizontal” and “vertical”, “clockwise” and “counter clockwise”, “front” and “rear”, or similar are used in the following terms, these typically only refer to the appended figures and not necessarily to an actual situation of use. The shown figures are schematic representations for which reason the configuration of the different structures as well as their relative dimensions are intended to serve illustrative purposes only.

DETAILED DESCRIPTION

Various aspects and embodiments of headset and/or hearing protection device comprising a waterproof speaker assembly as disclosed herein will now be described with reference to the figures.

The shown figures are schematic representations for which reason the configuration of the different structures as well as their relative dimensions are intended to serve illustrative purposes only.

Some of the different components are only disclosed in relation to a single embodiment of the invention, but is meant to be included in the other embodiments without further explanation.

Figure 1:
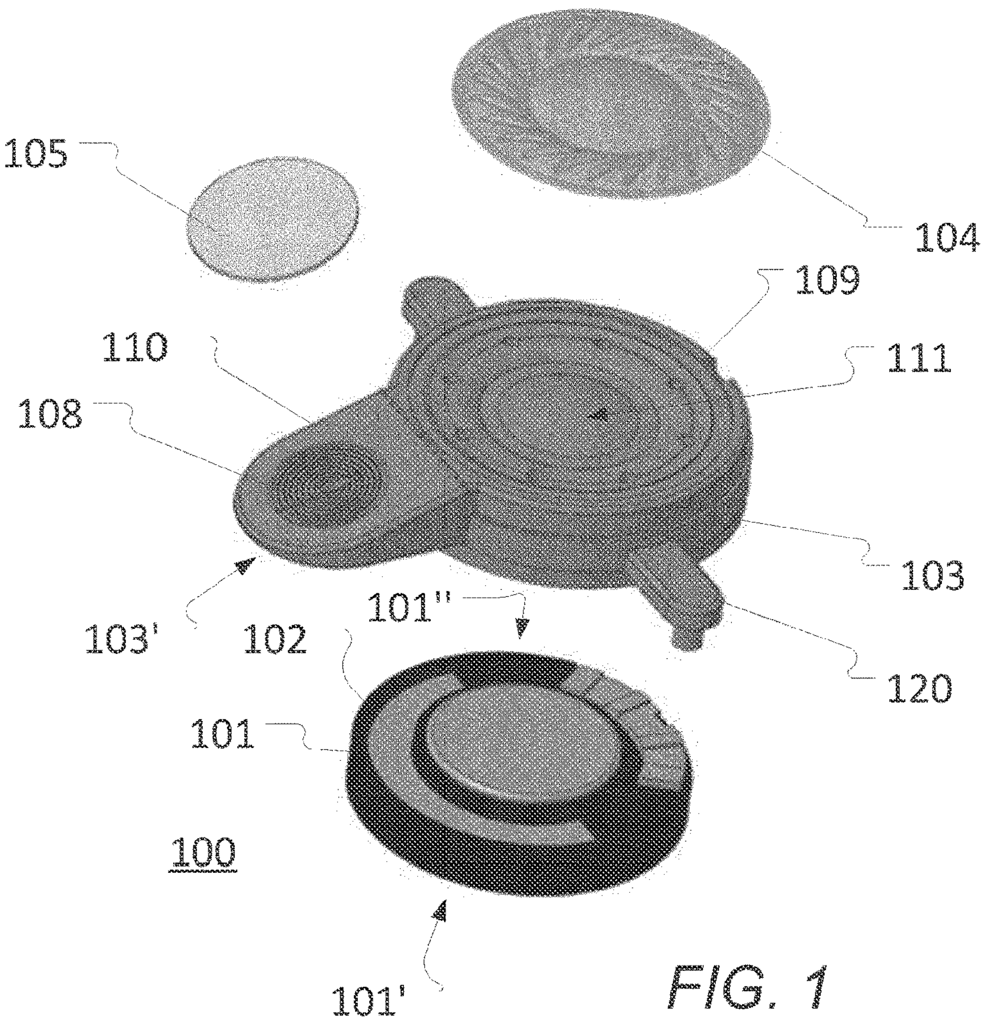
FIG. 1 schematically illustrates an exploded view of an exemplary embodiment of a waterproof speaker assembly as disclosed herein.

FIG. 1 schematically illustrates an exploded view of an exemplary embodiment of a waterproof speaker assembly as disclosed herein.

Shown is an exploded view of an embodiment of a waterproof speaker assembly 100 configured to be comprised a headset and/or hearing protection device, e.g. in an ear cup (see e.g. 301 and 300 in FIG. 6) as disclosed herein. The waterproof speaker assembly 100 comprises a speaker unit 101, a waterproof speaker housing 103, a slave membrane 104, and a waterproof pressure equalization element 105 being permeable to air; here, as an example, in the form of a waterproof pressure equalization membrane. The waterproof speaker housing 103 is configured to receive and/or support the slave membrane 104 and to receive and/or support the waterproof pressure equalization element 105. The speaker unit 101 has a first side 101' (facing the further or furthest away from the slave membrane 104 when all elements are in place in the assembly and/or from an interior or cavity (see e.g. 107 in FIG. 4) of the waterproof speaker housing 103) and a second side 101" (being opposite to the first side 101' and closer to the slave membrane 104 than the first side 101'). The speaker unit 101 comprises a transducer or similar configured to generate an audio frequency signal in response to an electric signal as generally known. The waterproof pressure equalization element 105 is configured to equalize surrounding or ambient pressure changes from the interior or cavity of the waterproof speaker housing 103 and the slave membrane 104 is configured to release the audio frequency signal (generated by the speaker unit 101) to outside of the waterproof speaker assembly 100, both as disclosed herein.

The waterproof speaker housing 103 comprises a plurality of openings, acoustic conduits, or the like 109 configured to release the audio frequency signal of the speaker unit 101 to or towards the slave membrane 104. In the shown embodiment of FIG. 1, the, as an example, seven openings, acoustic conduits, or the like 109 is equidistantly arranged in a circle on a surface of a (second) contact area or surface 111 receiving and/or supporting the slave membrane 104. The slave membrane 104 is, at least in some embodiments, waterproof. If the slave membrane 104 is not waterproof, the openings, acoustic conduits, or the like 109 preferably are waterproof e.g. by comprising a membrane (in each opening, etc.) or otherwise. In some embodiments, the speaker unit 101 is configured to generate the audio frequency signal from the second side 101", i.e. (in the shown and corresponding embodiments) directly towards the openings, etc. 109 and the slave membrane 104. In some embodiments, the speaker unit 101 comprises an acoustic, e.g. non-waterproof, damping felt or similar 102 on the second side 101".

The waterproof speaker housing 103 is configured to receive and sealable enclose the speaker unit 101 in an interior or a cavity (see e.g. 107 in FIG. 4) of the waterproof speaker housing 103. The waterproof speaker housing 103 sealable encloses the speaker unit 101 in the interior or a cavity in part (as shown for the exemplary embodiments of FIGS. 1-4) or in full. If in full, the speaker unit 101 is fully received and sealable encapsulated (except potentially by the openings, acoustic conduits, or the like 109) internally in the waterproof speaker housing 103, i.e. or e.g. in the interior or cavity.

If in part (as illustrated in FIGS. 1-4), (at least) the first side 101' of the speaker unit 101 is waterproof and the waterproof speaker housing 103 comprises an opening fitting or mating with the speaker unit 101 (to seal the connection between the waterproof speaker housing 103 and the speaker unit 101 so the connection between them is waterproof) where the waterproof speaker housing 103 then is further configured to receive the speaker unit 101 entering by its second side 101", i.e. the speaker unit 101 is received at least partly and internally in the waterproof speaker housing 103 with the waterproof first side 101' facing away from the slave membrane 104 and/or an interior of the waterproof speaker housing 103. Accordingly, the waterproof slave membrane 104 (and/or alternatively the waterproof openings, or the like 109), the waterproof pressure equalization element 105, the waterproof speaker housing 103, and the first side 101" of the speaker unit 101 together forms a waterproof volume enclosing a part of the speaker unit 101. This provides a very compact waterproof speaker assembly 100.

The first side 101' of the speaker unit 101 may be waterproof e.g. by comprising a further waterproof element or membrane (see e.g. 115 in FIGS. 2, 3, and 4) at its first side 101' or alternatively, the first side 101' of the speaker unit 101 is waterproof by itself/by design. The further waterproof element or membrane 115 may e.g. be similar to the slave membrane 104 (making manufacture simpler), as is the case in the shown embodiments of FIGS. 1-4. Alternatively, they may be different from each other.

In some embodiments (and as shown), the waterproof speaker housing 103 comprises or is connected to a waterproof side housing 103' receiving and/or supporting the waterproof pressure equalization element 105, i.e. the waterproof side housing 103' is arranged side-by-side to the rest of waterproof speaker housing 103. Accordingly, it is possible to provide a waterproof speaker assembly with a reduced height or profile whereby it takes up less space in a device comprising the waterproof speaker assembly. In some further embodiments (and as shown), the waterproof pressure equalization element 105 and the slave membrane 104 face generally a same direction. This enables both the waterproof pressure equalization element 105 and the slave membrane 104 to be protected, e.g. against touch of a user, by arranging the waterproof speaker assembly suitably in a device, e.g. a headset and/or hearing protection device. The waterproof pressure equalization element 105 and the slave membrane 104 may e.g. be arranged facing towards the interior of the headset and/or hearing protection device (e.g. away from an ear of a user), where a user of the device cannot or normally will not be able to touch them e.g. by hand, ear, etc. This is advantageous since both the waterproof pressure equalization element 105 and the slave membrane 104 typically are sensitive elements that may become bent, dented, or otherwise degraded by user touch. In some embodiments, the waterproof speaker housing 103 is connected to the waterproof side housing 103' via an acoustic channel or conduit (see e.g. 106 in FIGS. 2 and 4) so that the waterproof pressure equalization element 105 is connected to the interior or cavity of the waterproof speaker housing 103 that comprises the speaker unit 101.

In some further embodiments, the acoustic channel or conduit is configured to block or at least reduce the audio frequency signal from the interior or cavity towards the waterproof pressure equalization element 105 thereby minimising acoustic distortions otherwise potentially arising from the pressure equalization element 105 being exposed to too much sound pressure. Blocking or at least reducing the audio frequency signal from the interior or cavity may e.g. be done by letting the acoustic channel or conduit being relatively narrow and long. In some embodiments, the acoustic channel or conduit is about 4, 5, or 6 mm to about 14, 15, or 16 mm, respectively, long and/or about 0.8, 1, or 1.2 mm to about 1.6, 2, or 2.4 mm, respectively, wide. Generally, the acoustic channel or conduit could be longer without diminishing (at least significantly) the blocking or reduction effect of the audio frequency signal from the interior or cavity towards the waterproof pressure equalization element 105.

In some embodiment, the waterproof side housing 103' comprises a substantially flat first contact area or surface 110 to receive and/or support the waterproof pressure equalization element 105. Alternatively (e.g. for embodiments without a waterproof side housing 103'), the waterproof speaker housing 103 may comprise the substantially flat first contact area or surface 110 to receive and/or support the waterproof pressure equalization element 105. The substantially flat first contact area or surface 110 is, at least in some embodiments, configured to reduce a physical contact between the substantially flat first contact area or surface 110 and the waterproof pressure equalization element 105. As examples, the substantially flat first contact area or surface 110 comprises a grill or a mesh 108, e.g. (as and shown) in a shape or form of a predetermined number of concentric circles or alternatively other suitable shapes or forms. This ensures, or at least increases, the likelihood that the waterproof pressure equalization element 105 will not stick to the contact surface of the waterproof side housing 103' or the waterproof speaker housing 103, in particular after having been submersed in water. Alternatively, the first contact area or surface 110 is configured to provide anti-sticking properties in another suitable way.

In some embodiments (and as shown), the waterproof speaker housing 103 comprises a (second) contact area or surface 111 (as briefly mentioned above) receiving and/or supporting the slave membrane 104. In at least some further embodiments (and as shown), the second contact area or surface 111 has a shape mating, matching, or accommodating a shape of the slave membrane 104. The mating, etc. shape ensures (at least to a higher degree) that the slave membrane 104—when being pressed against the waterproof speaker housing 103, e.g. by water pressure arising from the waterproof speaker assembly 100 being submersed in water—holds or maintains its shape and thereby does not (at least to the same degree) become bent, dented, or otherwise degraded. Otherwise, subsequent acoustic distortions could arise.

In at least some embodiments (and as shown), the waterproof speaker assembly 100 further comprises one or more, e.g. two as shown, three, four, etc., securing elements 120 configured to secure the waterproof speaker assembly 100 to and/or within a headset and/or hearing protection.

The waterproof speaker assembly 100 is configured to allow electrical wires or conductors of the transducer to appropriately exit the waterproof speaker housing 103 while maintaining the speaker assembly 100 to be waterproof as generally known.

Decompression (and at least in some embodiments rapid decompression), e.g. when being in an environment with changing surrounding or ambient pressure, such as a pressurised aircraft cabin, or other, is readily enabled by the waterproof pressure equalization element 105 being connected via the acoustic channel or conduit 106 to the interior or a cavity 107 of the waterproof speaker housing 103. Accordingly, a waterproof speaker assembly and embodiments thereof is provided enabling efficient decompression while still providing good or sufficient audio quality.

Figure 2:
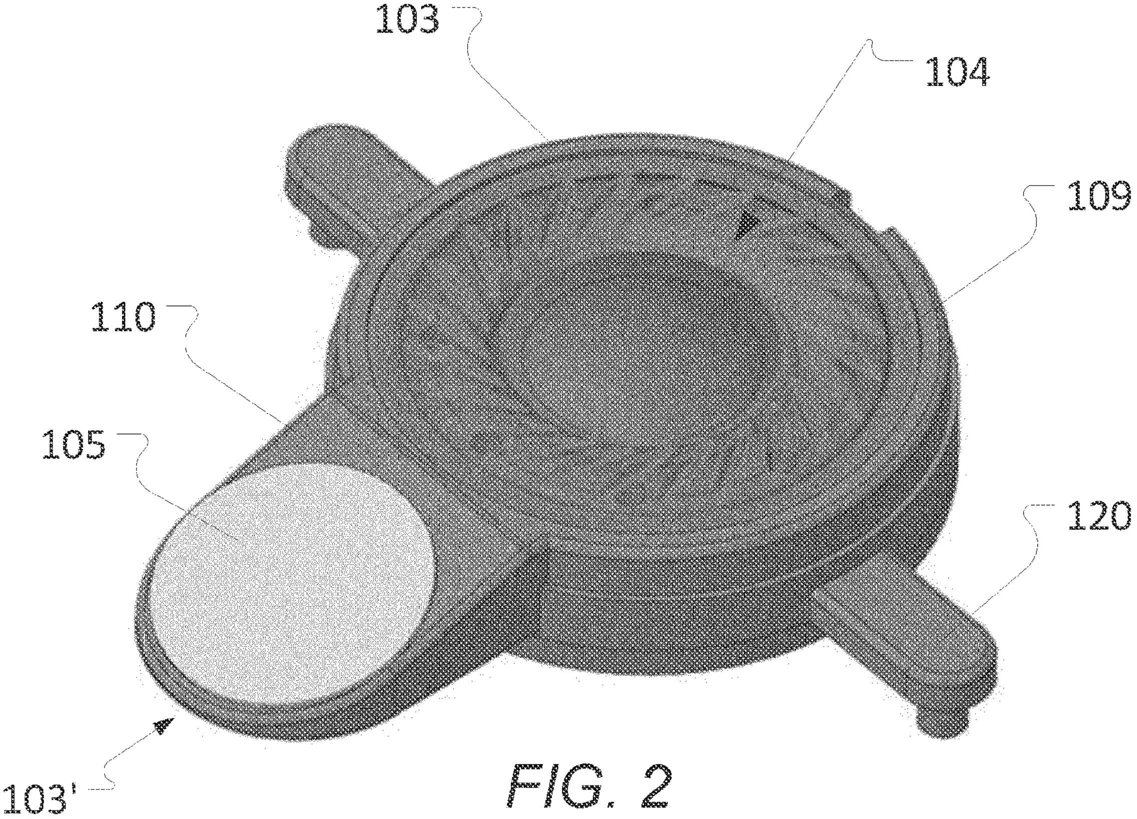
FIG. 2 schematically illustrates a perspective top or front view of the waterproof speaker assembly of FIG. 1.

FIG. 2 schematically illustrates a perspective top or front view of the waterproof speaker assembly of FIG. 1. Illustrated is the waterproof speaker assembly 100 of FIG. 1 in an assembled state shown from the top, front, or a first side of the waterproof speaker assembly 100. Shown is the waterproof speaker housing 103 receiving and/or supporting a slave membrane 104 on a (second) contact area or surface (see e.g. 111 in FIG. 1) and receiving and/or supporting a waterproof pressure equalization element 105 on a substantially flat first contact area or surface (see e.g. 110 in FIG. 1) of a waterproof side housing 103' as disclosed herein. To better illustrate the plurality of openings, acoustic conduits, or the like 109, the slave membrane 104 is shown transparently.

Figure 3:
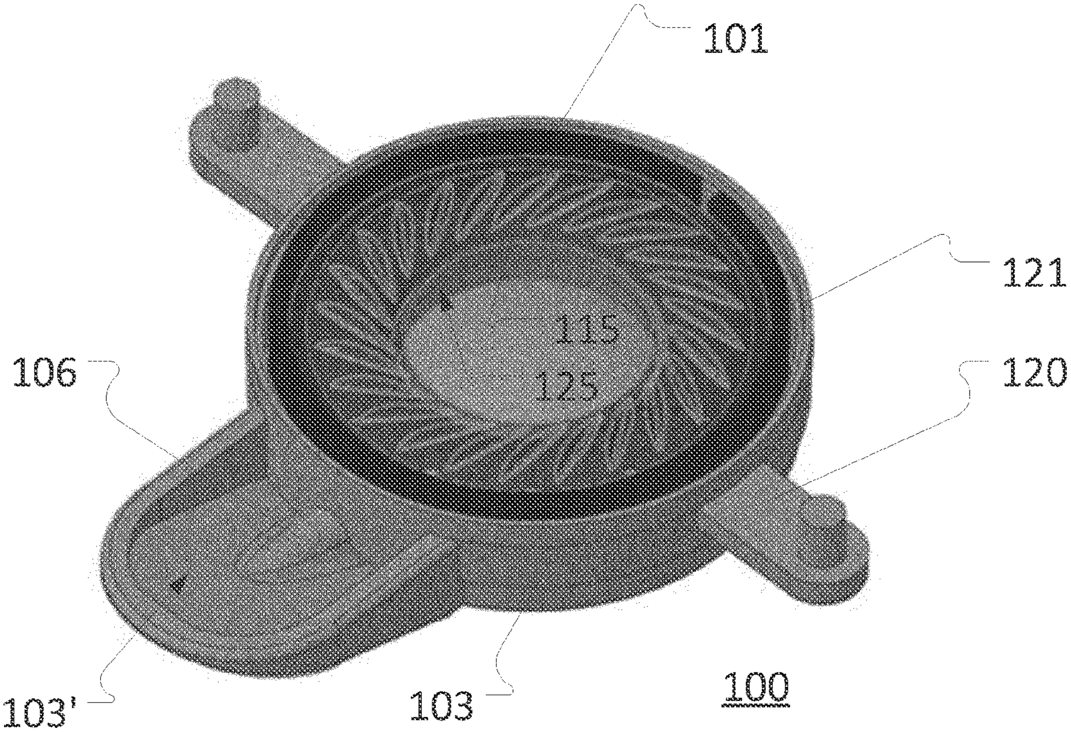
FIG. 3 schematically illustrates a perspective bottom or rear view of the waterproof speaker assembly of FIGS. 1 and 2.

FIG. 3 schematically illustrates a perspective bottom or rear view of the waterproof speaker assembly of FIGS. 1 and 2. Illustrated is the waterproof speaker assembly 100 of FIG. 1 in an assembled state shown from 'below', rear, or a second side of the waterproof speaker assembly 100. Shown is the waterproof speaker housing 103 and the waterproof side housing 103' with the acoustic channel or conduit 106 connecting the waterproof pressure equalization element 105 with the interior or cavity of the waterproof speaker housing 103 that comprises the speaker unit 101. More specifically (for the shown embodiment), the acoustic channel or conduit 106 connects the interior or cavity with the openings of the grill or a mesh (see e.g. 108 in FIGS. 1 and 4) of the first contact area or surface (see e.g. 110 in FIGS. 1 and 4). Illustrated is also a further waterproof element or membrane 115 located at the first side 101' of the speaker unit 101 making the speaker unit 101 waterproof (at least) towards this side. The further waterproof element or membrane 115 may e.g. be similar to the slave membrane 104 (making manufacture simpler). Alternatively, they may be different from each other. In some embodiments (and as shown), the further waterproof element or membrane 115 comprises a shape with an indentation pattern 121 configured to assist in maintaining the shape of the further waterproof element or membrane 115 even after being exposed to a high pressure, e.g. a water pressure arising from the waterproof speaker assembly 100 being submersed in water, pressing the further waterproof element or membrane 115 e.g. 'flat' against the speaker unit 101 or the waterproof speaker housing 103. In some embodiments (and as shown), the indentation pattern comprises a number of mainly elongated indentations 121 tilted or angled across radial directions (from a centre point) of the further waterproof element or membrane 115 (given the element or membrane is substantially circular). The further waterproof element or membrane 115 may e.g. comprise a circular concentric coil (sometimes referred to as voice coil), ring, or similar at the location pointed to by arrow 125. This buttress the membrane enabling it more readily to revert to its original or previous shape after a pressure, e.g. due to water, has been exerted upon it. It is noted, that the coil is not active (or necessarily magnetic) but rather function as a mechanical support. In some embodiments, the slave membrane comprises (either in addition or as an alternative), a similar or corresponding indentation pattern. In at least some embodiments, the slave membrane does not have a coil, ring, or similar but may be supported as disclosed herein.

Figure 4:
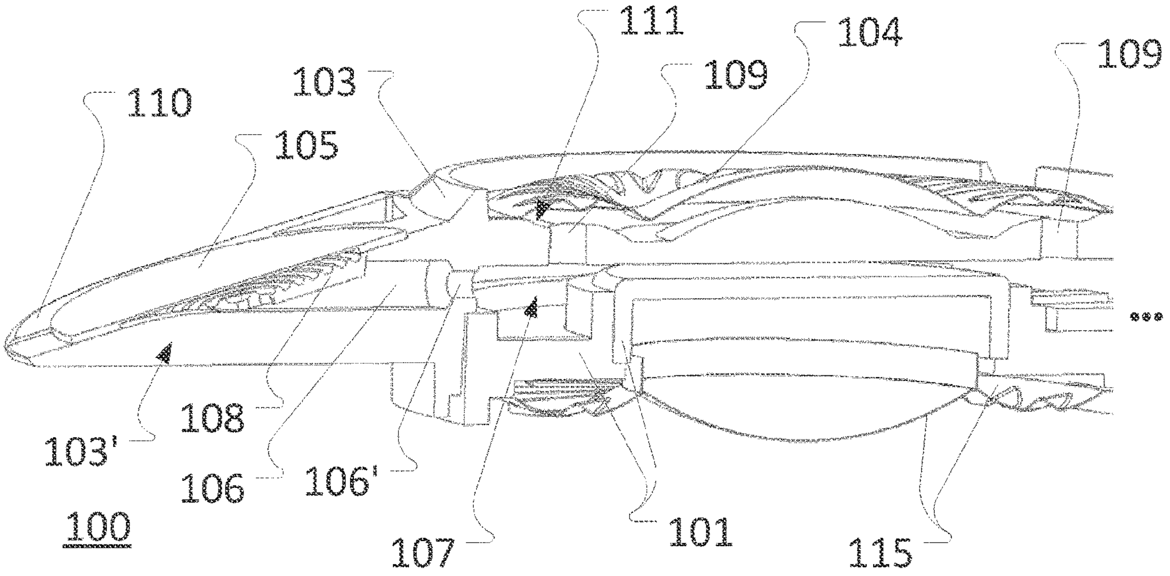
FIG. 4 schematically illustrates cross-sectional view of an alternative embodiment of a waterproof speaker assembly as disclosed herein.

FIG. 4 schematically illustrates cross-sectional view of an alternative embodiment of a waterproof speaker assembly as disclosed herein. Illustrated is a waterproof speaker assembly 100 as disclosed herein comprising a waterproof speaker housing 103 comprising a second contact area or surface 111 receiving and/or supporting a slave membrane 104 and a waterproof side housing 103' comprising a substantially flat first contact area or surface 110 receiving and/or supporting a waterproof pressure equalization element 105 being permeable to air. The first contact area or surface 110 further comprises a grill or a mesh or similar 108 reducing the contact surface with the waterproof pressure equalization element 105. The waterproof speaker assembly 100 further comprises a speaker unit 101 comprising a transducer and having a waterproof element or membrane 115 located at its first side (see e.g. 101' in FIG. 1) making the speaker unit 101 waterproof (at least towards this side). The waterproof speaker housing 103 further comprises a plurality of openings, acoustic conduits, or the like 109 configured to release an audio frequency signal of the speaker unit 101 to or towards the slave membrane 104. The embodiment (and variations thereof) of FIG. 4 corresponds to the embodiment (and variations thereof) of FIGS. 1-3 except that the shape of the waterproof speaker housing 103 is a bit different (the waterproof speaker housing 103 has a sharper ridge (near where reference number 103 points to) around where the slave membrane 104 is received) and the shape and the length of the acoustic channel or conduit 106 is different and shorter, respectively. The acoustic channel or conduit 106 is the area between the cavity 107 and the grill or a mesh 108 e.g. including the smaller opening 106' leading to the cavity 107. In the shown embodiment of FIG. 4, the acoustic channel or conduit 106 is not a full complete cylinder, although in other embodiments it might be.

Figure 5:
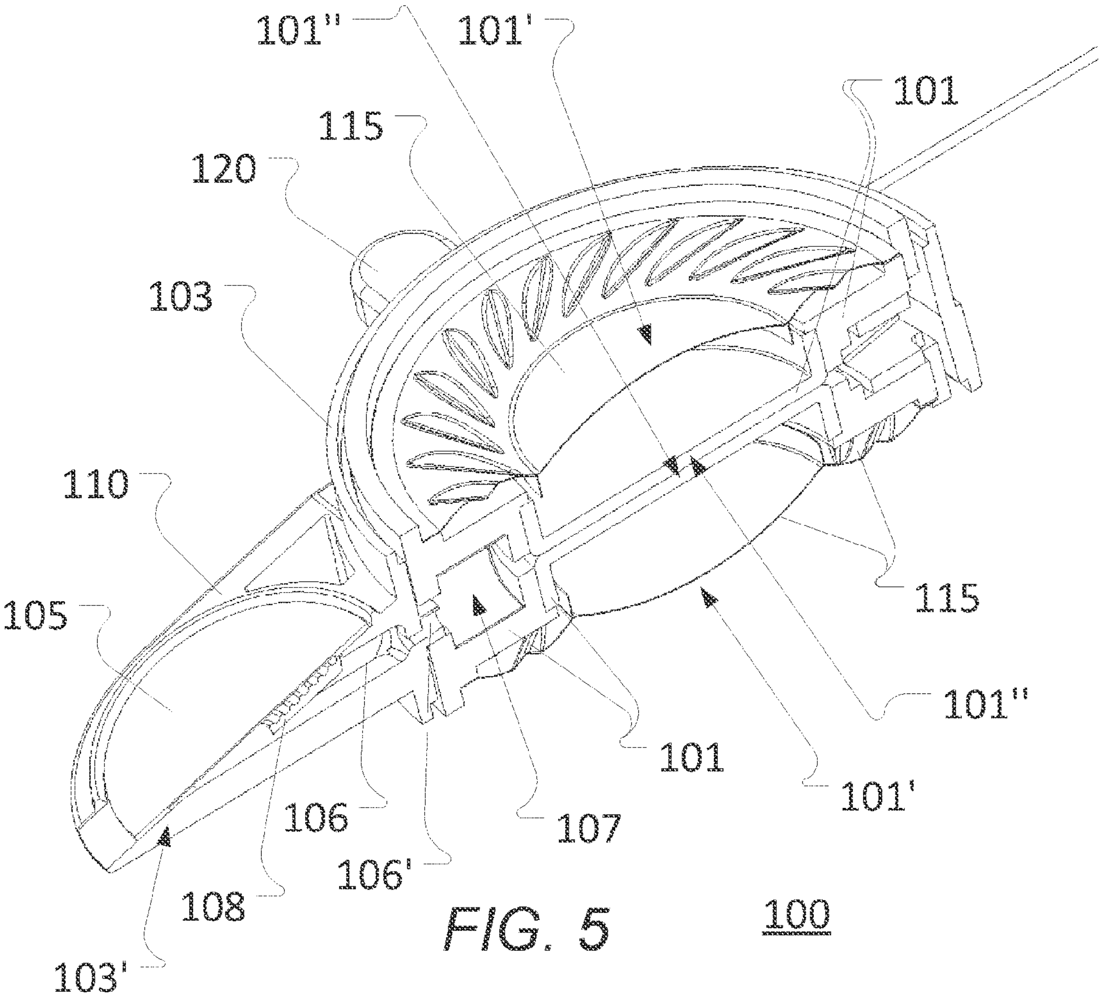
FIG. 5 schematically illustrates a perspective sectional view of another exemplary embodiment of a waterproof speaker assembly comprising two speaker units as disclosed herein.

FIG. 5 schematically illustrates a perspective sectional view of another exemplary embodiment of a waterproof speaker assembly comprising two speaker units as disclosed herein.

The embodiment of a waterproof speaker assembly 100 illustrated in FIG. 5 corresponds to e.g. the one illustrated in FIG. 4 except as noted in the following. Instead of the waterproof speaker assembly 100 comprising a slave membrane (see e.g. 104 in FIGS. 1-4) and a second contact area or surface (see e.g. 111 in FIGS. 1 and 4) for receiving and/or supporting the slave membrane then the waterproof speaker assembly 100 according to the illustrated and corresponding embodiments comprises two speaker units 101 that each, at least in some embodiments, correspond to a speaker unit as disclosed herein and e.g. as illustrated and described in connection with FIG. 4.

One or a first speaker unit 101 (in the Figure the lower one) of the two speaker units correspond to the speaker unit 101 of e.g. FIG. 4 and may basically have the same or similar functions and may be located in a same or similar way in the waterproof speaker housing 103. The other or a second speaker unit 101 (in the Figure the upper one of the two) more or less is located where the slave membrane is located for other alternative embodiments as disclosed herein. The second speaker unit 101 (upper)—compared to the embodiments comprising a slave membrane—'replaces' or is instead of the slave membrane.

In at least some embodiments, the two speaker units 101 are identical or at least similar (but could in other embodiments be different as disclosed herein). In some further embodiments, the two identical or similar speaker units 101 have different functionality in a certain respect as explained in the following.

Each speaker unit 101 (like the speaker unit e.g. of FIG. 4 also does) comprises a respective further waterproof element or membrane 115 (like the further waterproof element or membrane e.g. of FIG. 4) that actually could be similar to a slave membrane as disclosed herein. The respective further waterproof element or membranes 115 contribute to making the whole waterproof speaker assembly 100 waterproof and are each respectively received in a first and second opening of the waterproof speaker housing 103 where the openings sealingly mate or fit with the respective speaker units 101 so that a waterproof enclosure is provided. In the illustrated embodiment, the speaker units 101 are received by the respective openings 'in part' as disclosed herein. Alternatively, they could (either one or both) be received in full also as disclosed herein.

Each speaker unit 101 comprises a first 101' and an opposite second side 101" and are at least in some embodiments (and as illustrated) placed back-to-back (or magnet-to-magnet) in the waterproof speaker housing 103 so that the second sides 101" of the two speaker units touches (as illustrated) or at least faces each other and the respective first sides 101" faces away from the waterproof speaker housing 103. In the Figure, the leftmost pair of arrows 101' and 101" illustrate the sides for the lower speaker unit while the rightmost pair of arrows 101' and 101" illustrate the sides for the upper speaker unit.

The two speaker units 101 defines an interior or a cavity 107 of the waterproof speaker housing 103 that is connected, via an acoustic channel or conduit 106 (and in the illustrated embodiment a smaller opening 106'), to a waterproof pressure equalization element 105, all as disclosed herein.

In some embodiments, each of the speaker units 101 is configured to generate or emit the audio frequency signal as disclosed herein. In alternative embodiments, each of the speaker units 101 is configured to generate or emit a respective (e.g. overlapping) part of the audio frequency signal.

In some embodiments, one or the first speaker unit 101 is configured to generate or emit a first part, e.g. a high-frequency part or range, of the audio frequency signal from its second side 101" and the other or the second speaker unit 101 is configured to generate or emit a second part, e.g. a low-frequency part or range, of the audio frequency signal from its second side 101". In some embodiments, the second speaker unit 101 is a woofer or similar and the first speaker unit 101 is a tweeter or similar.

Figure 6:
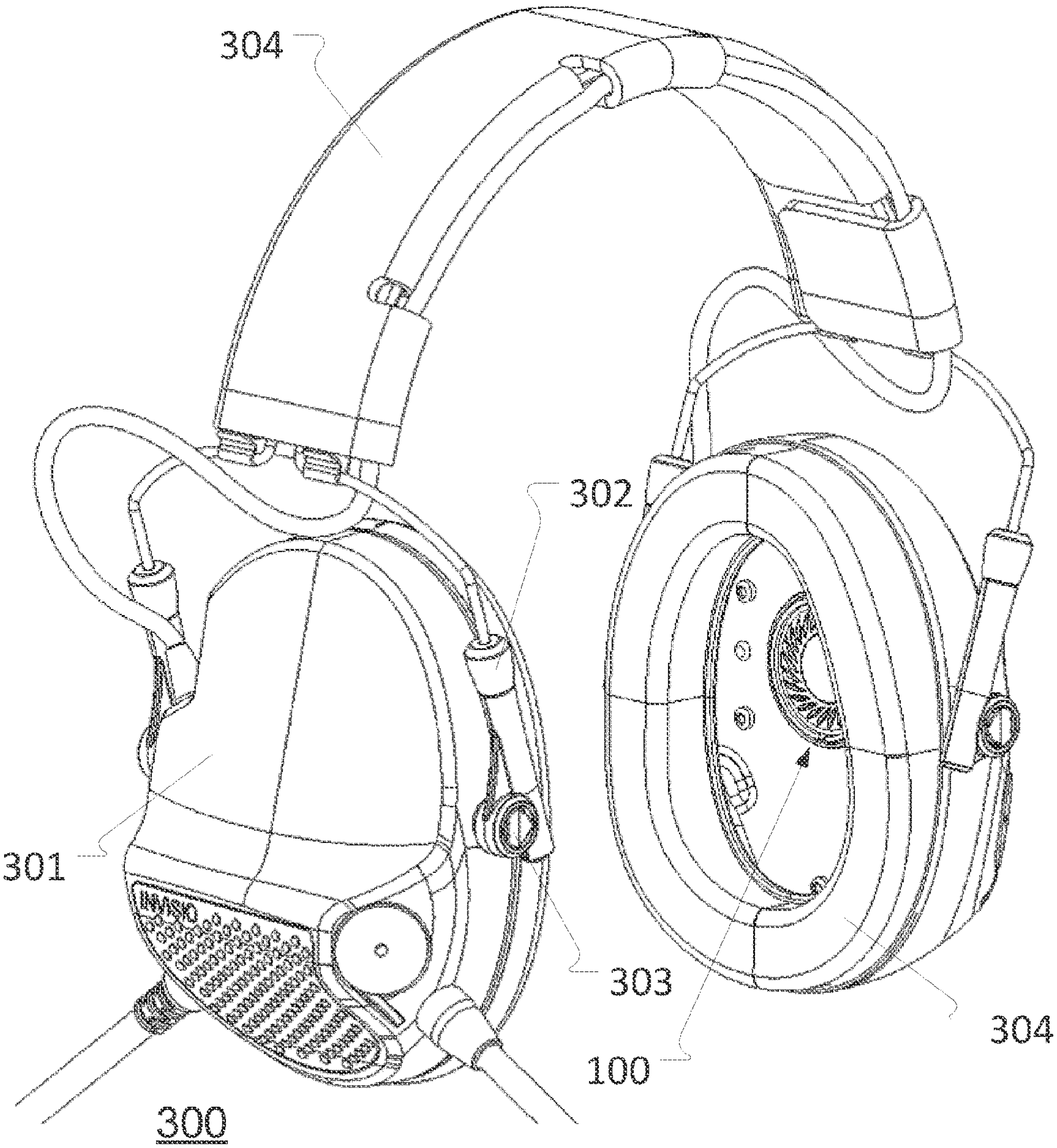
FIG. 6 schematically illustrates a headset and/or hearing protection device comprising a waterproof speaker assembly as disclosed herein.

In some embodiments, the second speaker unit 101 (e.g. generating or emitted a low-frequency part or range) is located (as shown) at the same side of the waterproof speaker housing 103 as the waterproof pressure equalization element 105 and this side is located away from the ear of a user when the waterproof speaker assembly 100 is in place in an ear cup of a headset and/or hearing protection device (see e.g. 300 in FIG. 6). Accordingly, the first speaker unit 101 (e.g. generating or emitted a high-frequency part or range) is located closest to the ear of the user.

In some embodiments, the sizes, dimensions, or at least diameters of the two speaker units are different (not shown), e.g. if the first speaker unit 101 is a woofer or similar and the second speaker unit 101 is a tweeter or similar, the woofer or similar will typically be larger than the tweeter or similar.

In some embodiments, the speaker units 101 are configured to generate or emit different respective audio frequency signals.

It is noted, that the shape of the waterproof speaker housing 103 is slightly different than the otherwise corresponding housing of e.g. FIG. 4 to accommodate an extra speaker unit 101 instead of a slave membrane.

To more clearly illustrate aspects of the drawing, the inner parts of the speaker units 101 are not illustrated.

FIG. 6 schematically illustrates a headset and/or hearing protection device comprising a waterproof speaker assembly as disclosed herein.

Illustrated is one example of a headset and/or hearing protection device 300 comprising one or two (as shown) ear cups 301, where at least one ear cup 301 comprises a waterproof speaker assembly 100 as disclosed herein. The headset and/or hearing protection device 300 comprises, as an example, a headband or similar 304 having height adjustment elements 302 to which an ear cup 301, comprising a cushion or similar 304, can be secured via a fixing element 303.

In some embodiments, the waterproof speaker assembly 100 is located so the waterproof pressure equalization element (and the second speaker unit (e.g. generating or emitted a high-frequency part or range) or the slave membrane 104 depending on embodiment(s)) is located away from the closest ear of a user when wearing the headset and/or hearing protection device 300.

Some preferred embodiments have been shown in the foregoing, but it should be stressed that the invention is not limited to these, but may be embodied in other ways within the subject matter defined in the following claims.

It should be emphasized that the term "comprises/comprising" when used in this specification is taken to specify the presence of stated features, elements, steps or components but does not preclude the presence or addition of one or more other features, elements, steps, components or groups thereof.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The mere fact that certain measures are recited in mutually different dependent claims does not indicate that a combination of these measures cannot be used to an advantage.

It will be apparent to a person skilled in the art that the various embodiments of the invention as disclosed and/or elements thereof can be combined without departing from the scope of the invention as defined in the claims.

The invention claimed is:

1. A headset and/or a hearing protection device, comprising:

a waterproof speaker assembly, the waterproof speaker assembly comprising a speaker unit comprising a transducer configured to generate an audio frequency signal, a waterproof speaker housing, the waterproof speaker housing is configured to receive and sealably enclose, in part or in full, the speaker unit in an interior or a cavity of the waterproof speaker housing, and a waterproof pressure equalization element being permeable to air; and wherein the waterproof speaker housing is configured to receive and/or support the waterproof pressure equalization element on an exterior of the waterproof speaker housing, and the waterproof pressure equalization element is configured to equalize surrounding or ambient pressure changes from the interior or cavity of the waterproof speaker housing.

2. The headset and/or a hearing protection device according to claim 1, wherein the waterproof speaker assembly comprises a slave membrane configured to release the audio frequency signal to outside of the waterproof speaker assembly, and wherein the waterproof speaker housing is configured to receive the slave membrane.

3. The headset and/or a hearing protection device according to claim 2, wherein the waterproof pressure equalization element and the slave membrane are arranged to generally face a same direction.

4. The headset and/or a hearing protection device according to claim 1, wherein the waterproof speaker housing comprises or is connected to a waterproof side housing receiving the waterproof pressure equalization element.

5. The headset and/or a hearing protection device according to claim 4, wherein the waterproof side housing is arranged side-by-side to a remaining part of the waterproof speaker housing.

6. The headset and/or a hearing protection device according to claim 1, wherein the waterproof pressure equalization element is connected to the interior or cavity via an acoustic conduit.

7. The headset and/or a hearing protection device according to claim 6, wherein the acoustic conduit is configured to block or at least reduce the audio frequency signal towards the waterproof pressure equalization element.

8. The headset and/or a hearing protection device according to claim 6, wherein the acoustic conduit is configured to be from about 5 mm to about 15 mm long and/or to be from about 1 mm to about 2 mm wide.

9. The headset and/or a hearing protection device according to claim 1, wherein the waterproof speaker housing or a waterproof side housing connected to the waterproof speaker housing includes a substantially flat first contact surface for receiving or supporting the waterproof pressure equalization element.

10. The headset and/or a hearing protection device according to claim 9, wherein the substantially flat first contact surface is configured to reduce a physical contact between the substantially flat first contact surface and the waterproof pressure equalization element.

11. The headset and/or a hearing protection device according to claim 10, wherein the substantially flat first contact surface includes a grill or a mesh configuration.

12. The headset and/or a hearing protection device according to claim 9, wherein the waterproof speaker housing comprises a second contact surface for receiving a slave membrane configured to release the audio frequency signal, the second contact surface has at least one of (i) a shape substantially accommodating a shape of the slave membrane, or (ii) a plurality of openings configured to release the audio frequency signal from the speaker unit to or towards the slave membrane.

13. The headset and/or a hearing protection device according to claim 1, wherein the speaker unit comprises a first side and an opposite second side, wherein the first side is waterproof and facing away from at least one of (i) a slave membrane configured to release the audio frequency signal to outside of the waterproof speaker assembly or (ii) the interior or cavity of the waterproof speaker housing, and wherein the waterproof speaker housing includes an opening configured to receive the speaker unit from the second side.

14. The headset and/or a hearing protection device according to claim 1, wherein the speaker unit comprises a first side and an opposite second side, wherein the speaker unit is configured to generate or emit the audio frequency signal from the second side, or the speaker unit comprises an acoustic damping material on the second side.

15. The headset and/or a hearing protection device according to claim 1, further including a slave membrane configured to release the audio frequency signal, and wherein the waterproof speaker housing comprises or is connected to a waterproof side housing, and wherein the slave membrane is located on an outside portion of at least one of the waterproof speaker housing and the waterproof side housing.

16. The headset and/or a hearing protection device according to claim 1, wherein the waterproof speaker housing comprises or is connected to a waterproof side housing, and wherein the waterproof pressure equalization element is located on an outside portion or an exterior of the waterproof side housing.

17. The headset and/or a hearing protection device according to claim 1, wherein the waterproof pressure equalization element is a waterproof pressure equalization membrane.

18. A headset and/or a hearing protection device, comprising:

a waterproof speaker assembly, the waterproof speaker assembly comprising
  - a speaker unit comprising a transducer configured to generate an audio frequency signal,
  - a waterproof speaker housing, the waterproof speaker housing is configured to receive and sealably enclose, in part or in full, the speaker unit in an interior or a cavity of the waterproof speaker housing, and
  - a waterproof pressure equalization element being permeable to air; and wherein the waterproof speaker housing is configured to receive and/or support the waterproof pressure equalization element, and the waterproof pressure equalization element is configured to equalize surrounding or ambient pressure changes from the interior or cavity of the waterproof speaker housing; and wherein the waterproof speaker assembly further comprises a second speaker unit, each of the two speaker units comprising a first side and an opposite second side, and wherein the first side of each of the two speaker units is waterproof and faces away from the interior or cavity of the waterproof speaker housing, the waterproof speaker housing comprises a first opening fitting or mating with the speaker unit and configured to receive the second side of the speaker unit, and the waterproof speaker housing comprises a second opening fitting or mating with the second speaker unit and configured to receive the second side of the second speaker unit.

19. The headset and/or a hearing protection device according to claim 18, wherein the two speaker units are located with their respective second sides being adjacent to or facing each other.

20. The headset and/or a hearing protection device according to claim 18, wherein each of the two speaker units is configured to generate or emit the audio frequency signal or a respective part of the audio frequency signal from the second side thereof.

21. The headset and/or a hearing protection device according to claim 20, wherein the speaker unit is configured to generate or emit a first part of the audio frequency signal from the second side thereof, and the second speaker unit is configured to generate or emit a second part of the audio frequency signal from the second side thereof.

22. The headset and/or a hearing protection device according to claim 18, wherein each of the two speaker units comprises an acoustic damping felt on the second side thereof.

* * * * *